United States Patent
Kweon et al.

(10) Patent No.: US 7,904,233 B2
(45) Date of Patent: Mar. 8, 2011

(54) FUEL INJECTION MEASUREMENT AND DIAGNOSTICS

(75) Inventors: Chol-Bum M. Kweon, Rochester, MI (US); Frederic Anton Matekunas, Troy, MI (US); Paul Anthony Battiston, Clinton Township, MI (US); Donald Terry French, Warren, MI (US); Ibrahim Haskara, Macomb, MI (US); Yue-Yun Wang, Troy, MI (US)

(73) Assignee: GM Global Technology Operations, Inc.

( * ) Notice: Subject to any disclaimer, the term of this patent is extended or adjusted under 35 U.S.C. 154(b) by 402 days.

(21) Appl. No.: 12/190,804

(22) Filed: Aug. 13, 2008

(65) Prior Publication Data
US 2009/0254262 A1 Oct. 8, 2009

Related U.S. Application Data

(60) Provisional application No. 61/043,220, filed on Apr. 8, 2008.

(51) Int. Cl.
G06F 17/00 (2006.01)
(52) U.S. Cl. .................................. 701/104; 123/299
(58) Field of Classification Search .................. 701/103, 701/104; 123/299, 300, 304, 305, 435, 478, 123/1 A, 494, 486
See application file for complete search history.

(56) References Cited

U.S. PATENT DOCUMENTS

| | | | |
|---|---|---|---|
| 5,359,883 A * | 11/1994 | Baldwin et al. | 73/114.16 |
| 5,482,016 A | 1/1996 | Ohishi et al. | |
| 5,592,915 A | 1/1997 | Ohishi et al. | |
| 5,712,424 A * | 1/1998 | Reed | 73/114.16 |
| 6,470,849 B1 | 10/2002 | Duffy et al. | |
| 6,553,211 B1 | 4/2003 | Zhou | |
| 7,197,918 B2 * | 4/2007 | Shen | 73/114.51 |

OTHER PUBLICATIONS

Sae International 2000-01-0932, *Cylinder-Pressure-Based Engine Control Using Pressure-Ration Management and Low-Cost Non-Intrusive Cylinder Pressure Sensors*, Mark C. Sellnau, Frederic A. Matekunas, Paul A. Battiston, Chen-Fang Chang, and David Lancaster, 22 pages, Copyright 2000.
Dissertation ETH No. 16037 titled, *Control-Oriented Modeling of a NO Emissions of SI Engines*, Daniel Brand, 182 pages, 2005.

* cited by examiner

*Primary Examiner* — Mahmoud Gimie

(57) ABSTRACT

A system and method comprises operating an engine during a first cycle to drive a piston in a cylinder without energizing a fuel injector of the cylinder; acquiring first pressure data of the cylinder for a predetermined crank angle window during the first cycle; energizing the fuel injector for an energizing time during a second cycle; acquiring second pressure data of the cylinder for the predetermined crank angle window during the second cycle; calculating a pressure ratio difference average (PRDA) from the first pressure data and the second pressure data; and modifying the operation of the fuel injector based on the PRDA value.

20 Claims, 9 Drawing Sheets

US 7,904,233 B2

FUEL INJECTION MEASUREMENT AND DIAGNOSTICS

CROSS-REFERENCE TO RELATED APPLICATIONS

This application claims the benefit of U.S. Provisional Application No. 61/043,220, filed on Apr. 8, 2008. The disclosure of the above application is incorporated herein by reference.

FIELD

The present disclosure relates to engine systems, and more particularly to control of fuel injection in an engine system.

BACKGROUND

An engine control system of a vehicle controls the delivery of air and fuel to a cylinder of an engine. The mixture of air and fuel is combusted within the cylinder to generate torque. More specifically, combustion of the air/fuel mixture releases thermal energy that drives pistons within the cylinders to power the vehicle. A fuel injector associated with the cylinder provides the fuel of the air/fuel mixture. The amount of fuel provided by the fuel injector is based on an amount of air provided to the engine for a target torque.

One way to reduce emissions from an engine involves recirculating exhaust gas into the combustion process. For example, exhaust gas recirculation (EGR) may be used in a diesel engine. EGR decreases exhaust emissions but tends to make combustion less stable. Providing a small pilot injection quantity (or "shot") prior to a main fuel injection shot may help to stabilize combustion when EGR is used. The amount of fuel in the pilot injection shot is typically less than the main shot. The amount and timing of the pilot injection shot is usually based on a calibrated amount for the engine. Deviations from the calibrated amount and timing of the pilot shot may reduce its effectiveness in aiding combustion and decreasing exhaust emissions.

Fuel injectors may be operated by associating a fuel injector energizing time with a fuel injection amount. The actual amount of the resulting pilot shot or main shot may be a function of the fuel injector construction and the pressure of the fuel delivered to the fuel injector from a fuel rail. A fuel injector calibration map may be created by performing a bench test. Actual injection amounts may be measured and stored for different injector energizing times at different fuel rail pressures. When a control system of the engine commands a particular fuel amount to be injected, the calibration map may be consulted to return a fuel injector energizing time for the fuel rail pressure. Any values not included in the calibration map may be interpolated from the calibration map.

Fuel injectors and engine systems may have variations such that a calibration map does not precisely match fuel injection characteristics in a particular vehicle. Fuel injectors may also be faulty or may degrade over time (i.e., injector aging). Injector aging may result in injection of fuel quantities different from the expected quantity for a particular energizing time and rail pressure. Pilot injection may involve quantities of fuel at the low end of the fuel injector operating range, particularly when the fuel rail pressure is high. The fuel injector may have a minimum energizing time, and at high fuel rail pressures may not be able to deliver a small amount of fuel desired for a pilot shot.

SUMMARY

A system and method comprises operating an engine during a first cycle to drive a piston in a cylinder without energizing a fuel injector of the cylinder; acquiring first pressure data of the cylinder for a predetermined crank angle window during the first cycle; energizing the fuel injector for an energizing time during a second cycle; acquiring second pressure data of the cylinder for the predetermined crank angle window during the second cycle; calculating a pressure ratio difference average (PRDA) from the first pressure data and the second pressure data; and modifying the operation of the fuel injector based on the PRDA value.

In other features, the energizing time is associated with a desired injected fuel amount. The system and method includes indexing a calibration map to determine the energizing time based on the desired injected fuel amount and a fuel rail pressure. The modifying includes changing at least one energizing time value of the calibration map based on the PRDA value.

In other features, the system and method includes indexing a PRDA map to determine an actual injected fuel amount based on the PRDA value and a fuel rail pressure. The system and method includes changing at least one energizing time of the calibration map when the actual injected fuel amount deviates from the desired injected fuel amount by more than a predetermined threshold.

In other features, the system and method includes accessing a PRDA map to determine an expected PRDA value based on the desired injected fuel amount and a fuel rail pressure. The system and method includes changing at least one energizing time of the calibration map when the actual PRDA value deviates from the expected PRDA value by more than a predetermined threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
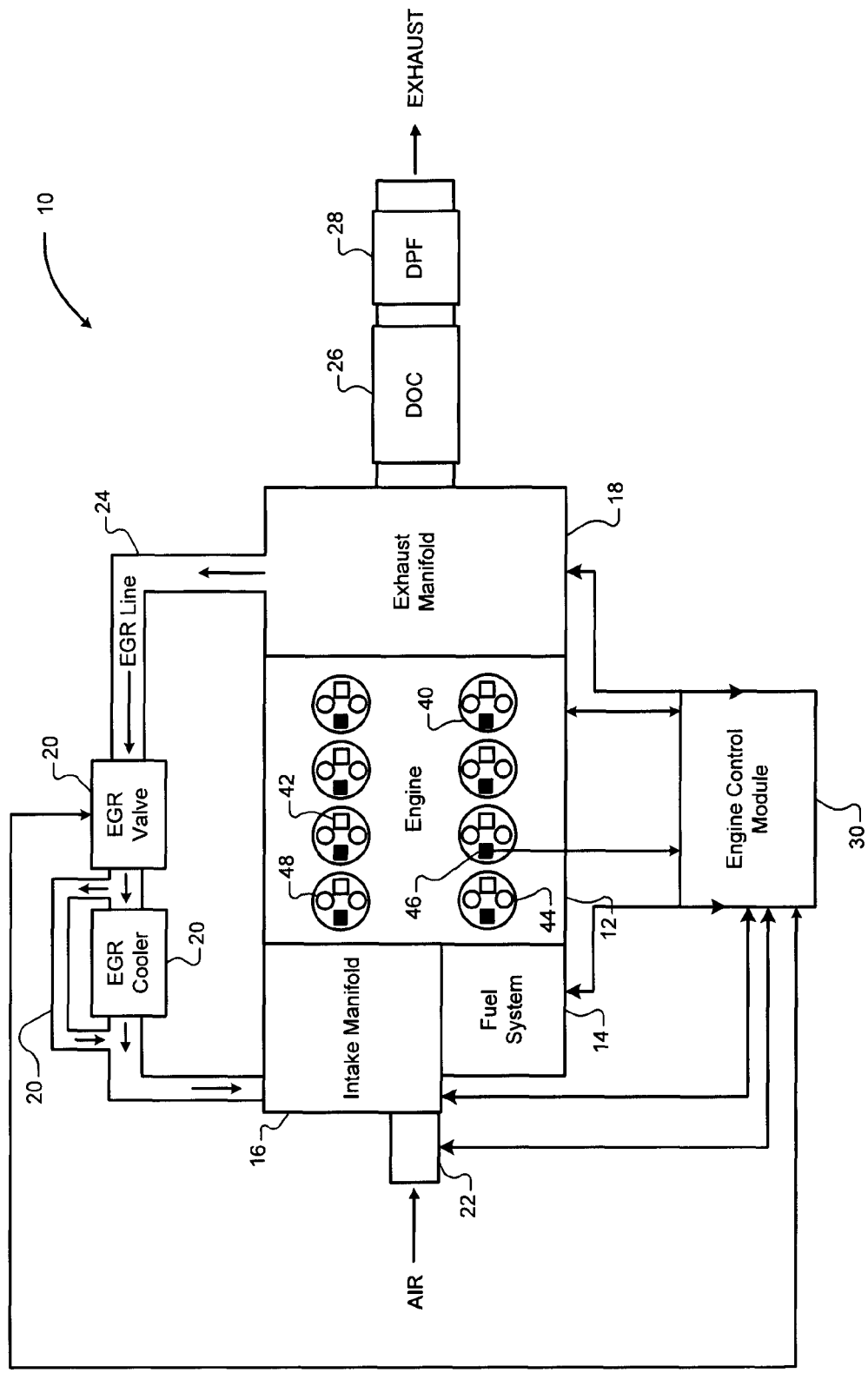
FIG. 1 is a functional block diagram of a diesel engine system according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring to FIG. 1, a diesel engine system 10 including fuel injection measurement and diagnostic system is depicted. Engine system 10 includes an engine 12 that combusts an air/fuel mixture to produce drive torque. Engine system 10 may also include fuel system 14, intake manifold 16, exhaust manifold 18, EGR valve 20, inlet 22, EGR line 24, diesel oxidation catalyst (DOC) 26, diesel particulate filter (DPF) 28, control module 30, cylinders 40, fuel injectors 42, intake valve 44, sensor 46, and exhaust valve 48.

For exemplary purposes, a diesel engine 12 is described. Air is drawn into an intake manifold 16 through an inlet 22. A throttle (not shown) may be included to regulate air flow into the intake manifold 16. Air within the intake manifold 16 is distributed into cylinders 40. Although FIG. 1 depicts eight cylinders, it should be appreciated that the engine 12 may include additional or fewer cylinders 40. For example, engines having 1, 2, 3, 4, 5, 6, 10, 12 and 16 cylinders are contemplated.

Engine system 10 includes an engine control module 30 that communicates with components of the engine system 10, such as the engine 12, fuel system 14, and associated sensors and controls as discussed herein. The engine control module 30 may include a calibration map and a PRDA map used with fuel system 14 and fuel injectors 42 to control fuel injection into cylinders 40.

Fuel system 14 may include a fuel pump (not shown) to pressurize fuel and a fuel rail (not shown) to deliver fuel to the fuel injectors 42. Fuel injectors 42 may be operated by commanding an energizing or on time. The amount of fuel delivered may be based on fuel rail pressure, energizing time, and fuel injector 42 construction.

Engine control module 30 electronically controls fuel injectors 42 to inject fuel into the cylinders 40. An intake valve 44 may selectively open and close to enable air to enter the cylinder 40. A camshaft (not shown) may regulate intake valve position. A piston (not shown) may compress the air/fuel mixture within the cylinder 40 to cause combustion.

A sensor 46 may be situated such that the pressure in the cylinder may be measured. These measured pressure values may be used by engine control module 30 for fuel injection measurement and diagnostics. Sensor 46 may be capable of providing measurements throughout the combustion cycle. In fuel injector measurement and diagnostics, the pressure over a particular crank angle window may be measured.

The piston may drive a crankshaft (not shown) to produce drive torque. The crankshaft may be interconnected with the respective pistons of cylinders 40 such that the pistons are driven in a predetermined pattern. Combustion exhaust within the cylinder 40 may be forced out through an exhaust manifold 18 when an exhaust valve 48 is in an open position. A camshaft (not shown) may regulate exhaust valve position.

A DOC 26 and a diesel particulate filter (DPF) 28 may treat exhaust gas. An exhaust gas recirculation (EGR) system that includes an EGR valve 20, EGR cooler 21, a bypass 22, and an EGR line 24 may introduce exhaust gas into the intake manifold 16. The EGR valve 20 may be mounted on the intake manifold 16 and the EGR line 24 may extend from the exhaust manifold 18 to the EGR valve 20, providing communication between the exhaust manifold 18 and the EGR valve 20. The EGR cooler 21 cools exhaust gas provided to the intake manifold 16. The bypass 22 allows exhaust gas to bypass the EGR cooler 21. The engine control module 30 may electronically control a position of the EGR valve 20.

Figure 2:
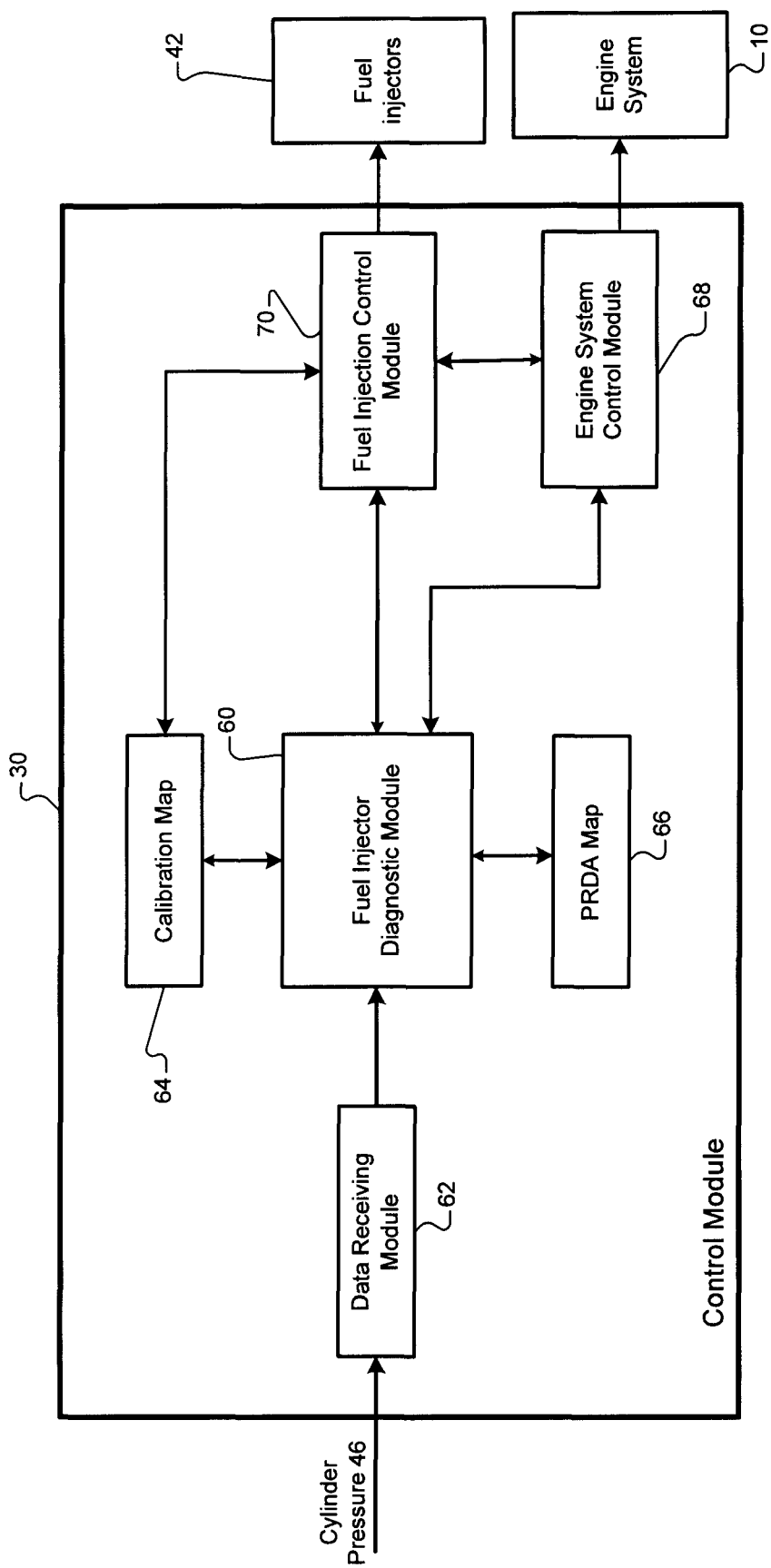
FIG. 2 is a functional block diagram of an engine control module according to the present disclosure.

Referring now to FIG. 2, control module 30 is described in more detail. Control module 30 may include fuel injector diagnostic module 60, data receiving module 62, calibration map 64, PRDA map 66, engine system control module 68, and fuel injection control module 70. These modules of control module 30 may provide for the normal functioning of fuel injector control as well as fuel injector measurement and diagnostics.

During normal operation, engine system control module 68 may include communicating with fuel injection control module 70 to command fuel injectors 42 to operate with an energizing time to provide a requested amount of fuel based on a known fuel rail pressure. Fuel injection control module 70 may communicate with calibration map 64 to determine a fuel injector 42 energizing time based on a desired fuel quantity and a known fuel rail pressure.

To perform fuel injector measurement and diagnostics, fuel injector diagnostic module 60 may communicate with data receiving module 62, calibration map 64, PRDA map 66, engine system control module 68, and fuel injection control module 70. Fuel injector diagnostic module 60 may command engine system control module 68 and fuel injection control module 70 to operate in a manner that allows measurement of fuel injection quantities and diagnostics.

A first step includes driving a piston in a motored state, wherein fuel is not injected into the cylinder 40. Pressure measurements taken during the motored state at specific engine speeds may provide a baseline for determining a fuel injection amount. A stored motored PR at a specific engine speed can also be used. After the baseline is determined, engine 12 may be operated such that the fuel injector 42 being tested is fired within an energizing time associated with a desired fuel amount as provided by calibration map 64. The fuel injector 42 being tested may be fired at specified times, such as during deceleration overruns. The baseline is compared to pressure measurements when fuel is injected into the cylinder. In other implementations, the engine 12 may be operated in a skip firing mode where the cylinder associated with the fuel injector 42 being tested is fired during two engine cycles and motored during two engine cycles.

Data receiving module 62 may receive cylinder pressure data 46 for both the motored and fired cycles. Pressure may be measured at a regular interval of crank angle degrees. An exemplary crank angle interval may be every 3°. Data from data receiving module 62 may be transmitted to fuel injector diagnostic module 60, which may store and use the pressure data to perform fuel injection measurement and diagnostics.

Fuel injector diagnostic module 60 may use the pressure data to determine a pressure ratio (PR) for each pressure measurement at given crankshaft angles. PR may be equivalent to the measured pressure divided by a calculated or theoretical pressure. PRDA may be calculated from a comparison of PR for a motored cycle and PR for a fired cycle over a particular window of engine operation, as represented by the following equation:

$$PRDA = \sum_{\#\#aTDC}^{\#\#aTDC} \frac{(PR\_Fired - PR\_Motored)}{\#\ Samples}$$

Once the PRDA value is determined, PRDA map 66 may be consulted to determine an amount of fuel associated with the measured PRDA value and a known fuel rail pressure, thus yielding an actual measured fuel amount. PRDA map 66 may be created by testing an exemplary engine to establish a relationship between PRDA, injection quantity and fuel rail pressure at a specific engine speed. Once PRDA map 66 is consulted to find the actual fuel injection quantity, fuel injector diagnostic module 60 may compare the measured fuel injection quantity to the desired fuel injection quantity for diagnostics and to update values in calibration map 64. In this manner, the fuel injector diagnostic module 60 may learn and update the calibration map 64 accordingly.

Figure 3:
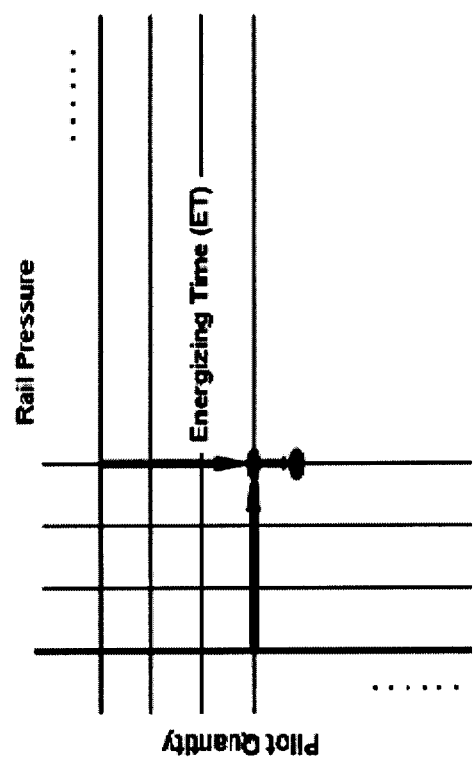
FIG. 3 is a depiction of exemplary pressure ratio difference average (PRDA) and fuel injector energizing time look-up tables.
Figure 3:
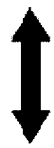
Figure 3:
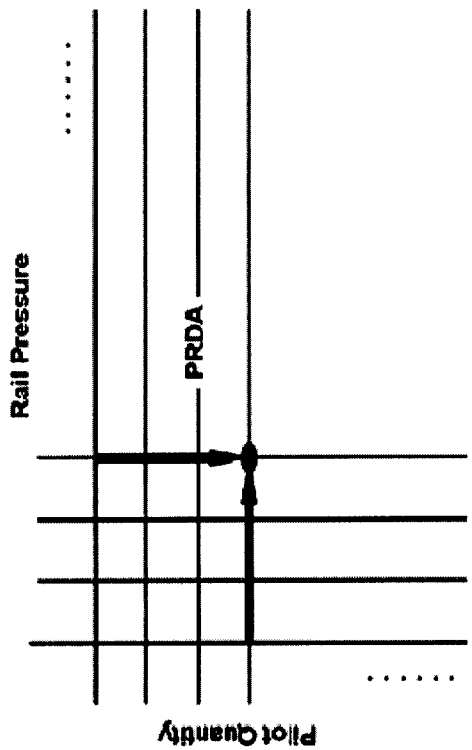

Referring now to FIG. 3, two look-up tables are depicted. The look up table on the right may be associated with calibration map 64. If a rail pressure and desired pilot or injection quantity are known, the energizing time can be looked up from the table. When coupled with the fuel injection measurement and diagnostic system, the energizing time values of calibration map 64 may be changed based on an actual measured fuel amount associated with a particular rail pressure.

The left side of FIG. 3 may be a look-up table for PRDA map 66. PRDA and injection quantity may have a relationship that may be measured and stored in PRDA map 66. When PRDA values are measured and rail pressure is known, PRDA map 66 may be used to determine an actual injected fuel amount.

Figure 4:
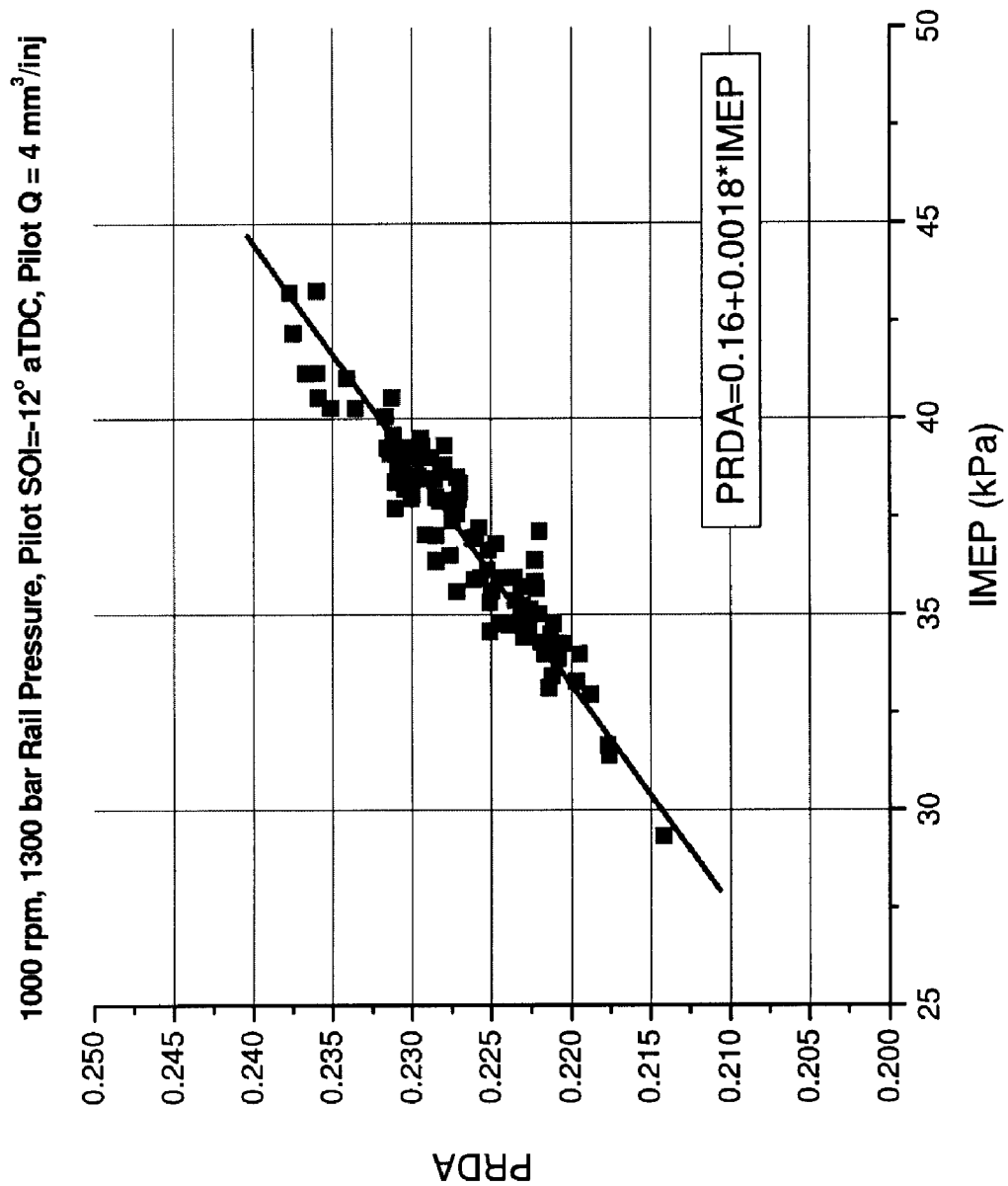
FIG. 4 depicts PRDA vs. indicated mean effective pressure (IMEP) for an exemplary fuel injector and operating conditions.

Referring now to FIG. 4, a relationship between measured PRDA values and measured indicated mean effective pressure (IMEP) values is depicted. As is known in the art, IMEP provides an indication of the useful work performed by the engine. If PRDA is providing an accurate measure of fuel injection quantity as expected, the graph of FIG. 4 should depict a linear relationship with IMEP. For this particular measurement in an exemplary engine, the engine is operating at 1000 rpm, the fuel rail pressure is 1300 bar, the pilot shot time for the fired shot is 12° before top dead center (bTDC), and the requested pilot quantity is 4 $mm^3$. FIG. 4 confirms that PRDA increases in a linear relationship with IMEP.

Figure 5:
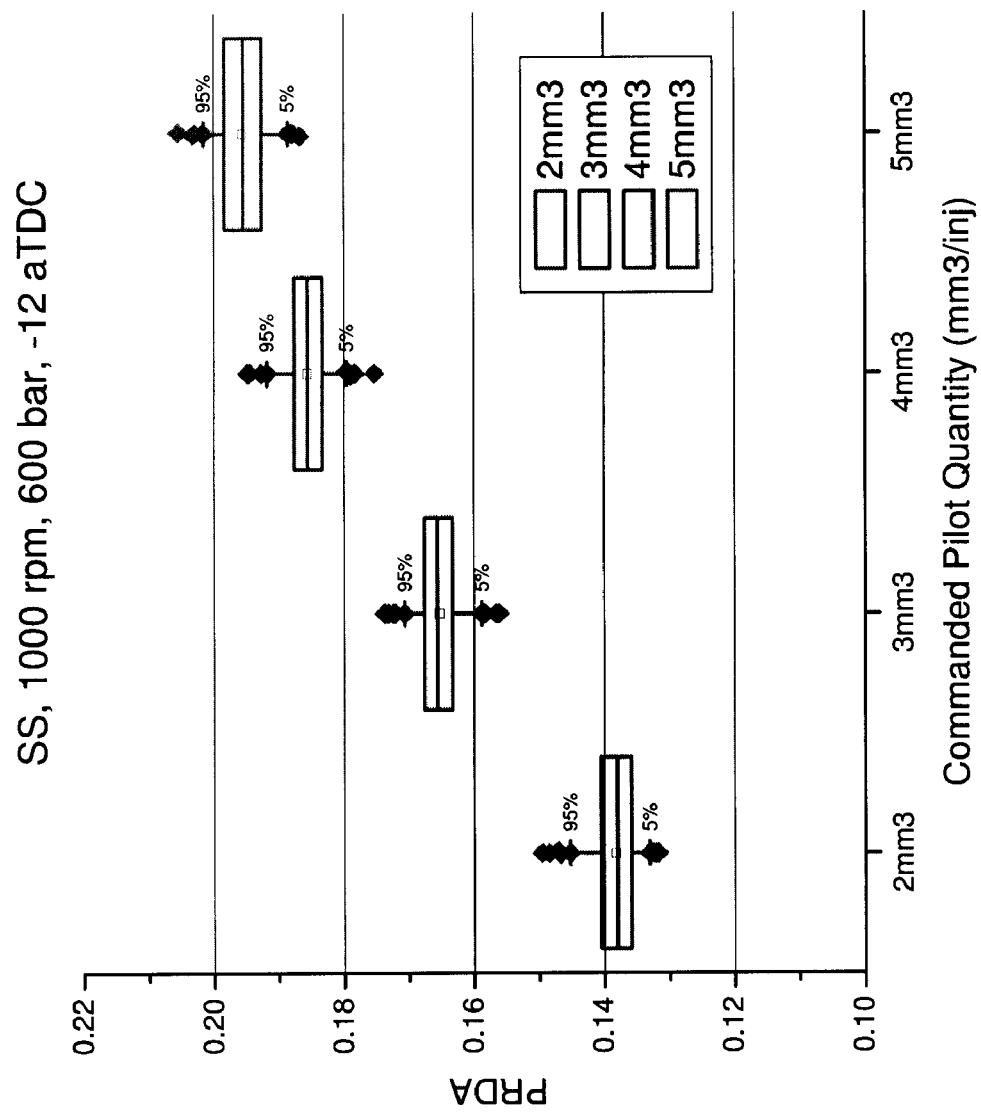
FIG. 5 depicts PRDA vs. an injected pilot quantity for an exemplary fuel injector and operating conditions.

Referring now to FIG. 5, a relationship between PRDA and a commanded pilot quantity is confirmed in an exemplary engine operating at 1000 rpm, a fuel rail pressure of 600 bar, and a pilot shot at 12°bTDC. PRDA measurements have been performed as described above. With the exception of the 4 $mm^3$ and 5 $mm^3$ desired pilot injection quantities, there is little overlap between the injection quantities and the PRDA measurements. Accordingly, PRDA appears to properly distinguish between different injection quantities. With respect to the 5 $mm^3$ commanded pilot quantity, it was confirmed that the injector at issue was actually providing less than 5 $mm^3$ as properly predicted by PRDA measurement.

Figure 6:
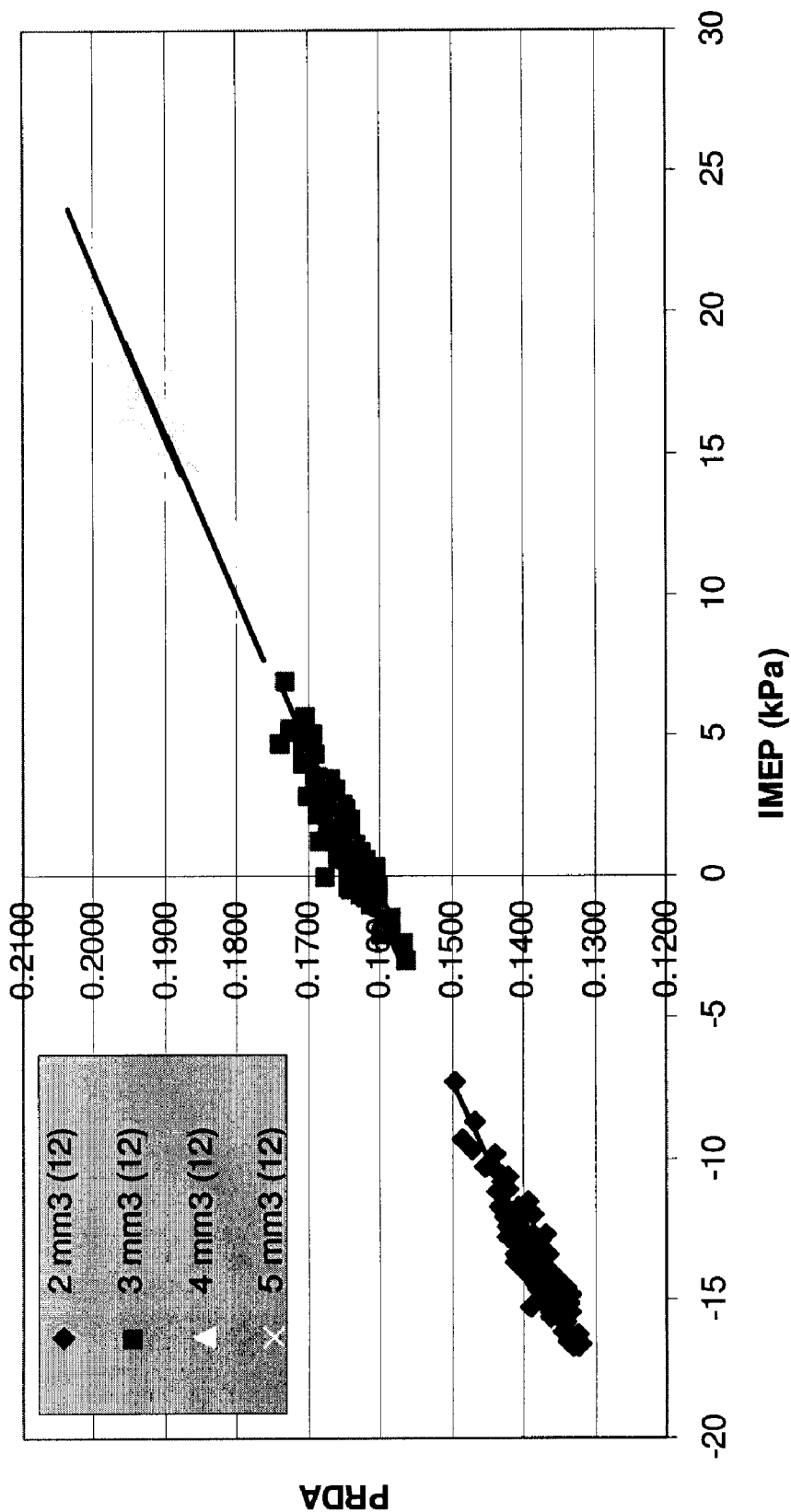
FIG. 6 depicts PRDA vs. IMEP for an exemplary fuel injector and operating conditions.

Referring now to FIG. 6, a plot of the PRDA values of FIG. 5 for the different injection amounts against IMEP confirms that greater injection amounts resulted in a greater IMEP, and vice versa. This is the relationship that is expected if PRDA is providing accurate measurements of the injection amount. It is also notable that the 5 $mm^3$ values overlap with the 4 $mm^3$ values, confirming expectations from the PRDA measurements of FIG. 5.

Figure 7:
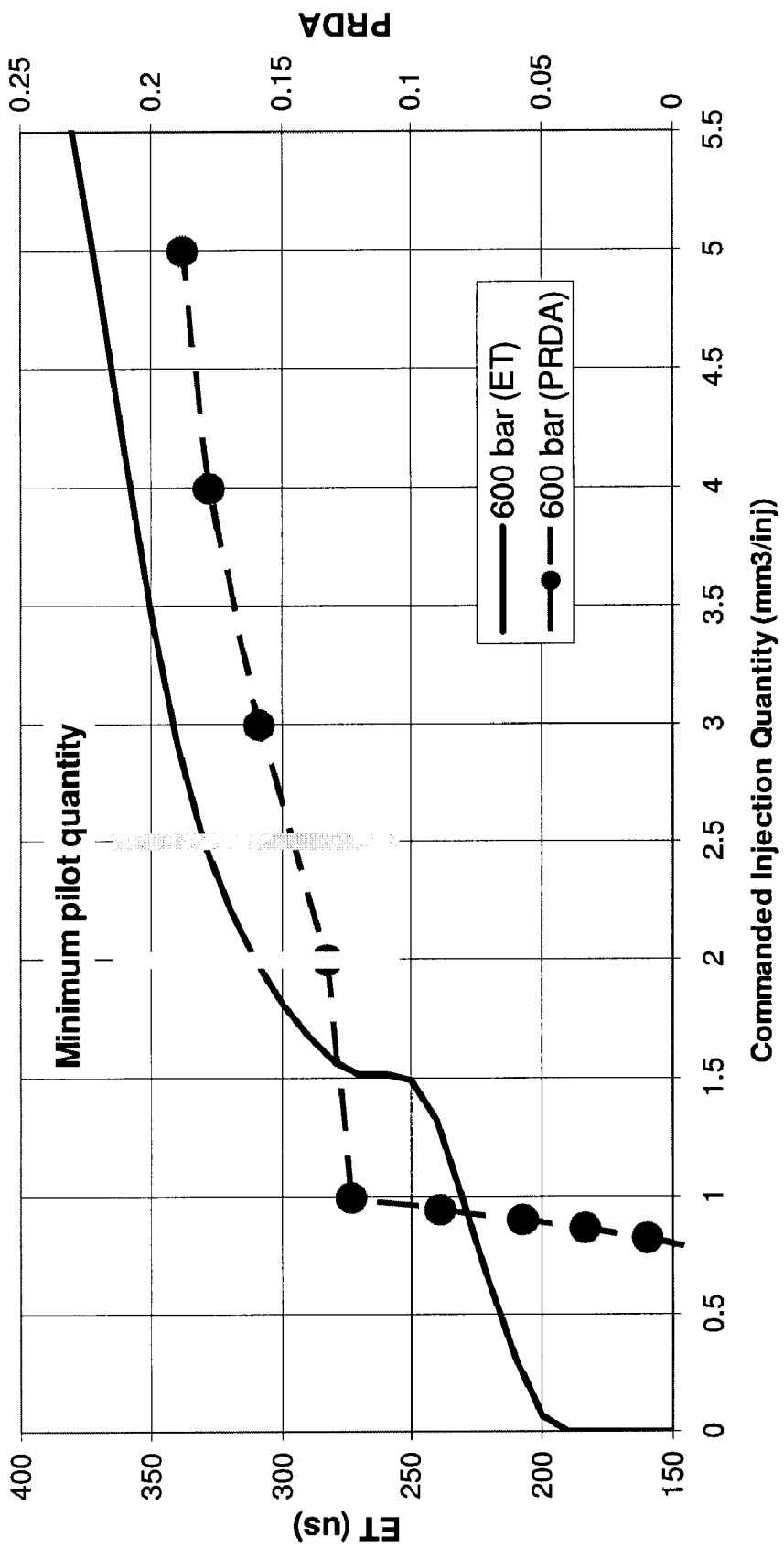
FIG. 7 depicts a fuel injector energizing time and PRDA vs. a commanded fuel injection quantity.

Referring now to FIG. 7, a graph depicting minimum pilot quantity detection using PRDA measurement is depicted. The solid line depicts energizing time values from an example calibration map to give the commanded injection quantity for the operating conditions of 1000 rpm, fuel rail pressure of 600 bar and injection timing of 12° bTDC. The dashed line depicts actual measured PRDA values associated with a commanded fuel injection quantity. As can be seen from the PRDA measurements, little to no fuel is actually injected below 1 $mm^3$ and PRDA may have a generally linear relationship above 2 $mm^3$. By using measured PRDA values, the calibration map can be adjusted for an actual minimum pilot quantity. The minimum value may be associated with the minimum value above which PRDA values maintain a linear relationship with the commanded fuel injection quantity.

Figure 8:
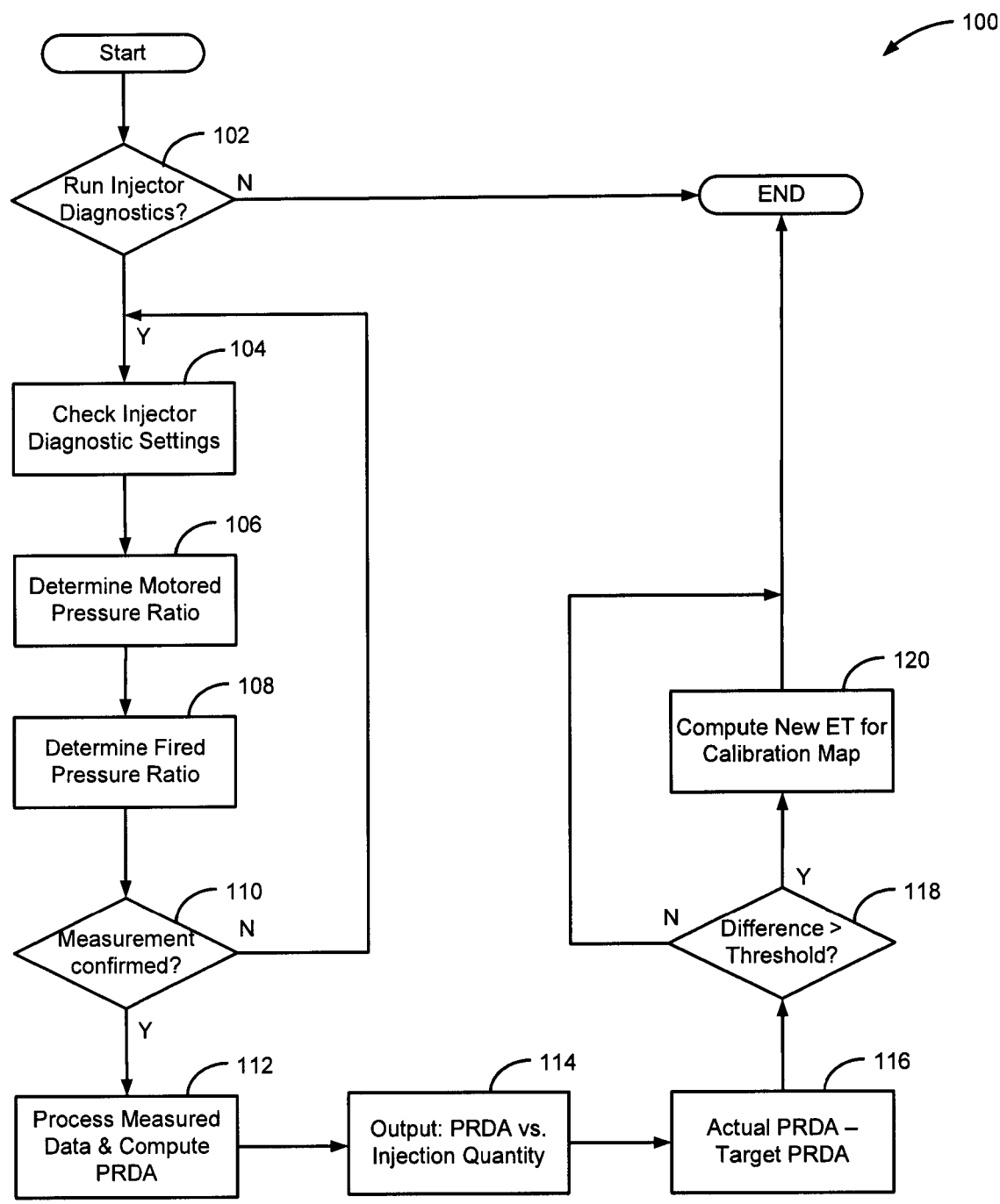
FIG. 8 is a flow diagram depicting steps in fuel injector diagnostics.

Referring now to FIG. 8, a flowchart depicting control logic 100 includes steps for performing fuel injector diagnostics. At block 102, fuel injector diagnostic module 60 may determine whether to run injector diagnostics, which may include testing actual injection quantities versus expected injection quantities. Injector diagnostics may be run at regular intervals during vehicle operation in order to test the fuel injector with various fuel rail pressures and injection amounts. If injector diagnostics are to be run, control logic 100 may continue to block 104

At block 104, fuel injector diagnostic module 60 may check fuel injector settings for fuel injector diagnostics. For example, fuel injector diagnostic module 60 may provide the sampling resolution, injection timing, injection quantity, injection pressure, and engine speed for fuel injector diagnostics. An example sampling resolution may include the crank angle measurement window during which the PR measurements will be performed for the motored and fired cycles. A sampling resolution may also include how often measurements are made during the crank angle window, such as every 3-6 crank angle degrees. Injection timing may include the timing for providing the injection shot, an example of which may be 12° bTDC. Finally, injection quantity may be a desired injection quantity that will be used to access an energizing time from calibration map 64. Control logic 100 may continue to block 106.

At block 106, fuel injector diagnostic module 60 may determine PR values for a motored cycle of a cylinder 40 associated with the fuel injector 42 to be tested. Fuel injector diagnostic module 60 may communicate with engine system control module 68 and fuel injection control module 70 to operate engine 12 such that a piston is driven in the cylinder 40 associated with the fuel injector 42 to be tested and no fuel is injected from the fuel injector 42 to be tested. Data receiving module 62 may receive cylinder pressure data from sensor 46 and provide the data to fuel injector diagnostic module 60 to calculate PR values. Once fuel injector diagnostic module 60 has pressure data for the motored cycle at a specific engine speed, control logic 100 may continue to block 108.

At block 108, fuel injector diagnostic module 60 may determine PR values for a fired cycle of the cylinder 40 associated with the fuel injector 42 to be tested. Fuel injector diagnostic module 60 may communicate with engine system control module 68 and fuel injection control module 70 to operate engine 12 such that a requested amount of fuel should be injected by the fuel injector 42 to be tested based on the energizing time values stored in calibration map 64 and the particular rail pressure. Data receiving module 62 may receive cylinder pressure data from sensor 46 and provide the data to fuel injector diagnostic module 60 to calculate PR values over the designated crank angle window. Fuel injector diagnostic module may establish the pressure data for the fired cycle and control logic 100 may then continue to block 110.

At block 110, fuel injector diagnostic module 60 may access external parameters to determine whether the engine operated properly during the measuring process. If any of the external parameters indicate an error in engine operation, control logic 100 may return to block 104 to attempt to measure pressure data again. Otherwise, control logic 100 may continue to block 112.

At block 112, fuel injector diagnostic module 60 may calculate PRDA based on the difference between the fired PR values and motored PR values over the crank angle measurement window. Control logic may continue to block 114. At block 114, fuel injector diagnostic module 60 may access PRDA map 66 to determine an actual fuel injection amount associated with the calculated PRDA value. Control logic may continue to block 116.

At block 116, the actual PRDA value may be compared to a target PRDA value accessed from PRDA map 66 for the particular rail pressure, injection amount, and engine speed. Alternatively, the actual injection amount from PRDA map 66 may be compared to the desired injection amount. Control logic 100 may continue to block 118. At block 118, fuel injector diagnostic module 60 may compare the error in the injected amount of fuel or PRDA value to an error threshold. The error threshold may be an absolute value or may be a percentage of the target injection amount. If the error does not exceed the threshold, control logic 100 may end. If the error exceeds the threshold, control logic 100 may continue to block 120.

At block 120, fuel injector diagnostic module 60 may communicate to engine system control module 68 that an error has occurred in a fuel injector 42. Engine system control module 68 may utilize this information to provide diagnostic codes that may be accessed by a technician. Fuel injector diagnostic module 60 may also update calibration map 64 based on the error. For example, fuel injector diagnostic module 60 may use the measured fuel injection amount to compute new energizing times and/or fuel amounts associated with calibration map 64. This may include updating the calibration map 64 with a new energizing time for the desired fuel amount and fuel rail pressure associated with the measurement. Other energizing times may also be changed based on the most recent measured fuel injection amount and other previous measured amounts. Once calibration map 64 is updated, control logic 100 may end.

Figure 9:
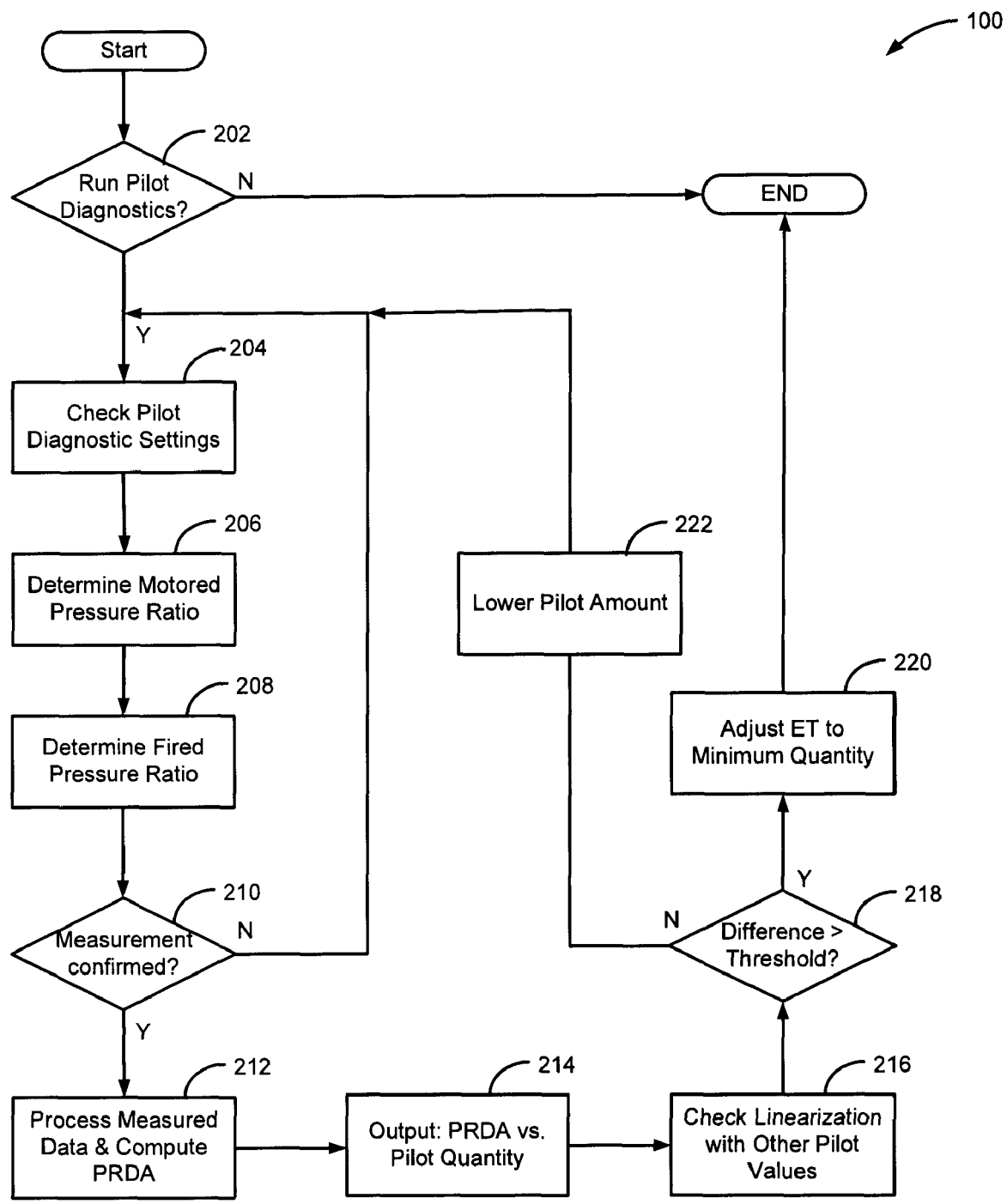
FIG. 9 is a flow diagram depicting steps in pilot injection diagnostics.

Referring now to FIG. 9, a flowchart depicting control logic 200 includes steps for performing pilot injection diagnostics. At block 202, fuel injector diagnostic module 60 may determine whether to run pilot diagnostics, which may include starting from a predetermined pilot amount and decreasing the pilot amount until pilot injection fails to fall within a linear pattern. Pilot diagnostics may be run at regular intervals during vehicle operation in order to test the fuel injector with various fuel rail pressures. If pilot diagnostics are to be run, control logic 200 may continue to block 204.

At block 204, fuel injector diagnostic module 60 may check fuel injector settings for pilot diagnostics. For example, fuel injector diagnostic module 60 may provide the sampling resolution, injection timing, injection quantity, rail pressure, and engine speed for pilot injection diagnostics. For example, the sampling resolution may include the crank angle measurement window during which the pressure measurements will be performed for the motored and fired cycles. A sampling resolution may also include how often measurements are made during the crank angle measurement window, such as every 3-6 crank angle degrees. Injection timing may include the timing to provide the pilot shot such as 12° bTDC. Finally, injection quantity may be an injection quantity that will be used to access an energizing time from calibration map 64. Initially for pilot diagnostics, the pilot amount may be set at a relatively high amount for the engine configuration, such as 3 mm$^3$. Control logic 200 may continue to block 206.

At block 206, fuel injector diagnostic module 60 may determine a motored PR for the cylinder 40 associated with the fuel injector 42 to be tested. Fuel injector diagnostic module 60 may communicate with engine system control module 68 and fuel injection control module 70 to operate engine 12 such that a piston is driven in the cylinder 40 associated with the fuel injector 42 to be tested and no fuel is injected from the fuel injector 42 to be tested. Data receiving module 62 may receive cylinder pressure data from sensor 46 over the designated crank angle window and provide the data to fuel injector diagnostic module 60 to determine the motored PR. Once fuel injector diagnostic module 60 has PR data for the motored cycle, control logic 200 may continue to block 208.

At block 208, fuel injector diagnostic module 60 may determine a fired PR for the cylinder 40 associated with the fuel injector 42 to be tested. Fuel injector diagnostic module 60 may communicate with engine system control module 68 and fuel injection control module 70 to operate engine 12 such that the pilot amount of fuel should be injected by the fuel injector 42 to be tested based on the energizing time values stored in calibration map 64 and the particular rail pressure. Data receiving module 62 may receive cylinder pressure data from sensor 46 over the designated crank angle window and provide the data to fuel injector diagnostic module 60 to determine the fired PR. Once fuel injector diagnostic module 60 establishes the PR data for the fired cycle, control logic 200 may then continue to block 210.

At block 210, fuel injector diagnostic module 60 may access external parameters to determine whether the engine operated properly during the measuring process. If any of the external parameters indicate an error in engine operation, control logic 200 will return to block 204 to attempt to measure pressure data again. Otherwise, control logic 200 may continue to block 212.

At block 212, fuel injector diagnostic module 60 may calculate PRDA based on the difference between the fired PR and motored PR over the crank angle measurement window. Control logic may continue to block 214. At block 214, fuel injector diagnostic module 60 may access PRDA map to determine a fuel injection amount associated with the calculated PRDA value. Control logic may continue to block 216.

At block 216, the actual PRDA value may be compared to other measured PRDA values for the particular rail pressure and engine speed at different injection amounts. As is depicted in FIG. 7, PRDA may have a linear relationship with injection amount when the fuel injector is above the minimum pilot amount. Fuel injector diagnostic module 60 may determine the amount that the measured PRDA values deviates from the expected linear value. Control logic 200 may continue to block 218. At block 218, fuel injector diagnostic module 60 may compare the deviation from the expected linear relationship to a maximum deviation. If the error does not exceed the maximum deviation, control logic 200 may continue to block 222. If the error exceeds the maximum deviation, control logic 200 may continue to block 220.

At block 220, fuel injector diagnostic module 60 may update calibration map 64 based on the minimum pilot quantity. For example, fuel injector diagnostic module 60 may set a minimum pilot amount in calibration map 64 as an energizing time greater than the energizing time associated with the deviated pilot amount by a threshold. Once calibration map 64 is updated, control logic 200 may end.

At block 222, fuel injector diagnostic module 60 may reduce the pilot amount to be tested and continue to test the pilot amount until a minimum is found. In this manner, pilot injection diagnostics will continue to reduce the amount tested until the minimum pilot amount is determined.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A method comprising:
operating an engine during a first cycle to drive a piston in a cylinder without energizing a fuel injector of the cylinder;
acquiring first pressure data of the cylinder for a predetermined crank angle window during the first cycle;
energizing the fuel injector for an energizing time during a second cycle;
acquiring second pressure data of the cylinder for the predetermined crank angle window during the second cycle;
calculating a pressure ratio difference average (PRDA) from the first pressure data and the second pressure data; and
modifying the operation of the fuel injector based on the PRDA value.

2. The method of claim 1 wherein the energizing time is associated with a desired injected fuel amount.

3. The method of claim 2 further comprising indexing a calibration map to determine the energizing time based on the desired injected fuel amount and a fuel rail pressure.

4. The method of claim 3 wherein the modifying includes changing at least one energizing time value of the calibration map based on the PRDA value.

5. The method of claim 3 further comprising indexing a PRDA map to determine an actual injected fuel amount based on the PRDA value and a fuel rail pressure.

6. The method of claim 5 further comprising changing at least one energizing time of the calibration map when the actual injected fuel amount deviates from the desired injected fuel amount by more than a predetermined threshold.

7. The method of claim 3 further comprising accessing a PRDA map to determine an expected PRDA value based on the desired injected fuel amount and a fuel rail pressure.

8. The method of claim 7 further comprising changing at least one energizing time of the calibration map when the actual PRDA value deviates from the expected PRDA value by more than a predetermined threshold.

9. The method of claim 1 wherein the energizing time is associated with a pilot shot from the fuel injector.

10. The method of claim 9 further comprising:
determining whether the PRDA value associated with the energizing time falls within a predetermined pattern compared to previous PRDA values;
reducing the energizing time; and
repeating the energizing, acquiring second pressure data, and calculating until the PRDA value for the reduced energizing time falls outside of the predetermined pattern compared to the previous PRDA values.

11. A control module comprising:
a fuel injection module operating a fuel injector to provide fuel to a cylinder of an engine for a commanded energizing time based on a desired fuel amount;
a pressure measurement module receiving pressure data for a predetermined crank angle window;
a diagnostic module commanding the fuel injection module to keep the fuel injector off for a first cycle and receiving first pressure data from the pressure measurement module for the first cycle, commanding the fuel injection module to operate the fuel injector for a first energizing time during a second cycle and receiving second pressure data from the pressure measurement module for the second cycle, calculating a pressure ratio difference average (PRDA) from the first pressure data and second pressure data, and modifying the operation of the fuel injector based on the pressure ratio difference average.

12. The control module of claim 11 wherein the first energizing time is associated with a desired injected fuel amount for the fuel injector.

13. The control module of claim 12 further comprising a calibration map indexing energizing time values based on desired injected fuel amount and fuel rail pressure.

14. The control module of claim 13 wherein the diagnostic control module changes at least one energizing time value of the calibration map based on the PRDA value.

15. The control module of claim 13 further comprising a PRDA map including PRDA values based on actual injected fuel amount and fuel rail pressure.

16. The control module of claim 15 wherein the diagnostic control module changes at least one energizing time of the calibration map when the actual injected fuel amount deviates from the desired injected fuel amount by more than a predetermined threshold.

17. The control module of claim 15 wherein an expected PRDA value is based on the desired injected fuel amount and a fuel rail pressure.

18. The control module of claim 17 wherein the diagnostic control module changes at least one energizing time of the calibration map when the actual PRDA value deviates from the expected PRDA value by more than a predetermined threshold.

19. The control module of claim 11 wherein the energizing time is associated with a pilot shot from the fuel injector.

20. The control module of claim 19 wherein the diagnostic control module determines whether the PRDA value associated with the energizing time falls within a predetermined pattern compared to previous PRDA values, reduces the energizing time, and repeats the energizing, acquiring second pressure data, and calculating until the PRDA value for the reduced energizing time falls outside of the predetermined pattern compared to the previous PRDA values.

* * * * *